US010810670B2

(12) United States Patent
Lawrence

(10) Patent No.: US 10,810,670 B2
(45) Date of Patent: *Oct. 20, 2020

(54) SECURITIES TRADING SYSTEM WITH MULTIPLE LEVELS-OF-INTEREST

(71) Applicant: BGC PARTNERS, INC., New York, NY (US)

(72) Inventor: David Lawrence, New York, NY (US)

(73) Assignee: BGC PARTNERS, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/215,185

(22) Filed: Dec. 10, 2018

(65) Prior Publication Data
US 2019/0108591 A1    Apr. 11, 2019

Related U.S. Application Data

(63) Continuation of application No. 13/224,483, filed on Sep. 2, 2011, now Pat. No. 10,152,747, which is a
(Continued)

(51) Int. Cl.
G06Q 40/00 (2012.01)
G06Q 40/04 (2012.01)
G06Q 30/08 (2012.01)

(52) U.S. Cl.
CPC ............. *G06Q 40/04* (2013.01); *G06Q 30/08* (2013.01)

(58) Field of Classification Search
CPC ...................................................... G06Q 40/00
(Continued)

(56) References Cited

U.S. PATENT DOCUMENTS

| 3,573,747 A | 4/1971 | Adams et al. |
| 3,581,072 A | 5/1971 | Nymeyer |

(Continued)

FOREIGN PATENT DOCUMENTS

| WO | WO 00/63814 | 10/2000 |
| WO | WO 01/27836 | 4/2001 |

OTHER PUBLICATIONS

U.S. Appl. No. 60/294,851, May 2001, Lawrence.
(Continued)

*Primary Examiner* — Ojo O Oyebisi

(57) ABSTRACT

Disclosed is a securities trading program for trading individual lots of a security which can be run at a security trader's computer station. The program generates a trading screen comprising a listing of multiple bids for the security, each bid having a price, as well as a listing of multiple priced offers for the security. The bid and offer listings are active, enabling the trader to hit any one of the displayed bids or take any one of the displayed offers, for example by selecting and clicking on a displayed bid or offer. In one embodiment, the bids and offers are arranged in side-by-side columns on the trader's screen, helping the trader to rapidly overview the market for a particular security, and compare different, possibly competitive, securities by paging through level-of-interest windows for each security. The invention's easily manipulated insights into market dynamics offers a sophisticated trader new opportunities to profitably exploit market niches, for example by browsing for attractive bids or offers on closely comparable securities.

18 Claims, 7 Drawing Sheets

Related U.S. Application Data continuation of application No. 10/150,476, filed on May 17, 2002, now Pat. No. 8,015,097.

(60) Provisional application No. 60/294,851, filed on May 31, 2001.

(58) Field of Classification Search
USPC .......................................................... 705/37
See application file for complete search history.

(56) References Cited

U.S. PATENT DOCUMENTS

| | | | |
|---|---|---|---|
| 4,789,928 A | 12/1988 | Fujisaki | |
| 4,903,201 A | 2/1990 | Wagner | |
| 4,965,825 A | 10/1990 | Harvey et al. | |
| 4,980,826 A * | 12/1990 | Wagner | G06Q 40/04 705/37 |
| 5,117,354 A | 5/1992 | Long et al. | |
| 5,243,515 A | 9/1993 | Lee | |
| 5,297,031 A | 3/1994 | Gutterman et al. | |
| 5,297,032 A | 3/1994 | Trojan et al. | |
| 5,313,560 A | 5/1994 | Maruoka et al. | |
| 5,535,383 A | 7/1996 | Gower | |
| 5,544,281 A | 8/1996 | Maruoka et al. | |
| 5,724,524 A | 3/1998 | Hunt et al. | |
| 5,774,880 A | 6/1998 | Ginsberg | |
| 5,857,176 A | 1/1999 | Ginsberg | |
| 5,905,974 A | 5/1999 | Fraser et al. | |
| 5,915,209 A | 6/1999 | Lawrence | |
| 6,021,398 A | 2/2000 | Ausubel | |
| 6,026,381 A | 2/2000 | Barton, III et al. | |
| 6,125,355 A | 9/2000 | Bekaert et al. | |
| 6,161,099 A | 12/2000 | Harrington et al. | |
| 6,233,566 B1 | 5/2001 | Levine et al. | |
| 6,278,982 B1 | 8/2001 | Korhammer et al. | |
| 6,560,580 B1 | 5/2003 | Fraser et al. | |
| 6,850,907 B2 | 2/2005 | Lutnick et al. | |
| 6,963,856 B2 | 11/2005 | Lutnick et al. | |
| 8,015,097 B2 | 9/2011 | Lawrence | |
| 10,150,476 B2 | 12/2018 | Norwood | |
| 10,152,747 B2 | 12/2018 | Lawrence | |
| 2002/0059129 A1 * | 5/2002 | Kemp, II | G06Q 40/06 705/37 |
| 2002/0095369 A1 | 7/2002 | Kaplan et al. | |
| 2002/0156719 A1 | 10/2002 | Finebaum et al. | |
| 2002/0188555 A1 | 12/2002 | Lawrence | |
| 2003/0093343 A1 * | 5/2003 | Huttenlocher | G06Q 40/04 705/35 |
| 2003/0093359 A1 | 5/2003 | Martyn et al. | |
| 2004/0044610 A1 | 3/2004 | Fraser et al. | |
| 2005/0160032 A1 | 7/2005 | Lutnick et al. | |
| 2006/0265315 A1 | 11/2006 | Friesen et al. | |
| 2007/0250438 A1 | 10/2007 | Fraser et al. | |
| 2019/0108591 A1 | 4/2019 | Lawrence | |

OTHER PUBLICATIONS

International Search Report for International Application No. PCT/US02/16932, dated Apr. 23, 2003 (1 page).

International Preliminary Examination Report for International Application No. PCT/US02/16932, dated May 29, 2003 (3 pages).

USPTO Office Action for U.S. Appl. No. 10/150,476, dated Apr. 18, 2007 (9 pages).

USPTO Office Action for U.S. Appl. No. 10/150476, dated Nov. 29, 2007 (13 pages).

USPTO Petition Decision for U.S. Appl. No. 10/150,476, dated Mar. 31, 2008 (1 page).

USPTO Office Action for U.S. Appl. No. 10/150,476, dated Apr. 2, 2009 (14 pages).

USPTO Office Action for U.S. Appl. No. 10/150,476, dated Jan. 20, 2010 (16 pages).

USPTO Pre-Brief Appeal Conference Decision for U.S. Appl. No. 10/150,476, dated Aug. 30, 2010 (2 pages).

USPTO Notice of Allowance and Fees Due for U.S. Appl. No. 10/150,476, dated Dec. 6, 2010 (7 pages).

Kenny Information Systems, Inc., "KennyBase User's Guide," dated 1990.

Kenny S&P, "The Blue List," dated Jun. 1992.

Blue List Information Systems, Inc., "The Blue List Broker Display Network User's Guide," dated Jul. 20, 1992.

Bondweek, "FBC Gains New Accounts with GovTrade," dated Oct. 5, 1992.

Fabkom, Inc., "Municipal Trading System," dated Aug. 19, 1993.

Bondweek, "Fuji, Daiwa Taking Treasury Trading on Line," dated Aug. 30,1993.

Business Wire, "Municipal Market Data Initiates Beta Testing of the ANVIL Network," dated Oct. 4, 1993.

Bloomberg's "The Bond Buyer's Municipal Market Place Buyer's Guide," dated Fall 1994.

Wall Street Journal, "Electronic Trading in Bond Market is Slow to Catch on," dated Jun. 3, 1998.

Federal Register vol. 56, No. 40. p. 8377 regarding Wunsch Auction Systems, Inc.'s Wunsch System, dated Feb. 28, 1991.

SEC letters regarding Wunsch Auction Systems, Inc.'s Wunsch System dated Aug. 28, 1990, Feb. 28, 1991, Jun. 22, 1992, Sep. 9, 1992, Jun. 6, 1995, Jun. 29, 1995, Nov. 6, 1995 and Nov. 15, 1995.

SEC letters regarding Inv.ervest Financial Services, Inc.'s CrossCom dated Aug. 3, 1992 and Nov. 24, 1992.

SEC letters regarding Fagin, Kopley & Hanson, Inc.'s LIMITrader dated Mar. 7, 1991, Sep. 11, 1991, Oct. 1, 1991 and Nov. 25, 1991.

SEC letters regarding Cantor Fitzgerald dated Sep. 30, 1993 and Oct. 1, 1993.

USPTO Notice of Allowance and Fees Due for U.S. Appl. No. 10/150,476, dated Apr. 22, 2011 (8 pages).

* cited by examiner

Figure 5

Figure 9

SECURITIES TRADING SYSTEM WITH MULTIPLE LEVELS-OF-INTEREST

CROSS-REFERENCE TO RELATED APPLICATIONS

This application is a continuation of U.S. patent application Ser. No. 13/224,483 filed Sep. 2, 2011 which is a continuation of U.S. patent application Ser. No. 10/150,476 filed May 17, 2002 (now U.S. Pat. No. 8,015,097 issued on Sep. 6, 2011), which claims the benefit of provisional application No. 60/294,851 filed May 31, 2001.

STATEMENT REGARDING FEDERALLY SPONSORED RESEARCH OR DEVELOPMENT (Not applicable.)

BACKGROUND OF THE INVENTION

1. Field of the Invention

The present invention relates to a securities trading system comprising computer implementable program software intended for implementation with supporting hardware. It relates to a securities trading system which enables securities traders, or other users, to make and hit bids and to make and take offers for purchase or sale of securities, especially, but without limitation, bonds or other fixed income securities.

More particularly, the invention relates to such a securities trading system which is suitable for deployment on the Internet, or an equivalent wide area network to enable a multiplicity of users located remotely from one another to effectively create and transact trades in U.S. government, municipal, corporate or other bonds or other fixed income securities or instruments. It is also contemplated that the invention may be applicable to trading in fixed income futures and derivatives as well as to trading in stocks and stock futures and derivatives, albeit with suitable adaptations of conventional practices as will be apparent to those skilled in the art.

2. Description of Related Art Including Information Disclosed Under 37 CFR 1.97 and 37 CFR 1.98

In recent years, many systems have been proposed and employed to facilitate electronic trading in valuable financial securities. Nevertheless, even in the year 2001, available electronic systems fail to provide a trader with adequate functionality to enable him or her to fully realize the potential of electronic commerce.

The invention relates particularly to an improved system for trading securities especially fixed income securities, such as treasury, municipal or corporate bonds, in real time, or near real time, employing electronically linked user stations, which system provides an individual trader with enhanced functionality enhancing the trader's performance. The user stations are equipped for data processing, being, for example, computerized. The Internet provides one suitable medium for linking the user stations and preferred embodiments of the invention are adapted for use with the Internet. Use of the invention with other communications media suitable for linking users stations, such as local area networks, intranets or other wide area networks or modifications or subsets will be apparent to those of ordinary skill in the art.

Financial securities, for example stocks and bonds, oil, grain and other commodities, as well as many other products as diverse as livestock and fine art, have long been traded by means of what is known as an "open outcry auction". Typically, buyers and sellers assemble at a location where they present bids or offers to the assembled group, via simple vocal bids and offerings, a process sometimes known as a "bid-ask" or "ask-bid" system. In many cases, the presentations are made by a broker acting on behalf of client buyers or sellers. In some instances professional brokers may be required, especially for specialized valuable commodities such as financial securities. Open outcry auctions lie at the heart of traditional exchanges, where they may provide a useful price determining mechanism. While open outcry auctions have provided an effective marketplace for many different products, they can be expensive and inconvenient. Furthermore, open outcry auctions have limited capacity and become increasingly error-prone as trading volumes increase.

Another drawback of the open outcry auction system of market making is a lack of price transparency, in that participating traders may know only the tip of the iceberg of the book of unfilled orders, namely the ones that are vocalized. There is no way for a trader to see or execute on other levels of interest in the market than those that are vocalized.

An important class of fixed income securities are those issued by the United States Government, which are known as U.S. treasuries. There are three different types of U.S. treasuries having different maturity terms at issue, namely, Treasury bills having maturities of 13 to 52 weeks, Treasury notes or "MTNs" (medium term notes) having maturities of one to ten years, and Treasury bonds having maturities of up to 30 years. Treasury bills, being short term instruments, are pure discount securities having no coupons whereas notes and bonds, having longer terms, have a defined payment cycle of semi-annual interest payments to the holder. The interest rate is known as the "coupon", which term is derived from a detachable paper portion which was found on older, paper, bearer bonds.

Advantages of Treasuries to investors include their low and uniform default risk, attributable to their backing by the full faith and credit of the U.S. government, and their liquidity. Market pricing reflects these benefits.

New Treasury securities issue with a face or "par" value, for example $10,000,000.00, an interest rate or "coupon" payable, for example 5.500 percent and a maturity date, for example Feb. 22, 2011. Such a note constitutes a promise by the issuer, the United States government, to pay the par value on the maturity date. Treasury bills are auctioned by the U.S. government on preestablished auction dates and the auction prices define the issuance yields of the security. After the auction, the Treasuries enter the secondary market and are traded typically "over the counter", i.e., without a defined exchange. As inflation expectations, supply and demand and other conditions change, so the prices Treasuries fluctuate on the secondary market. These new prices are reflected by competing bid and ask prices communicated among institutions, banks, brokers, and dealers in the secondary market using electronic notification systems such as DOW JONES (trademark), TELERATE (trademark) and BLOOMBERG (trademark). The yield of a fixed income security, such as a Treasury note increases as its price drops in the market, typically reflecting an overall increase in the interest rates for that term of security.

Newly auctioned Treasuries, and other fixed income securities, are traded alongside securities issued in earlier auctions, with the more recently issued securities usually being more active in the market, which is to say traded more often than older securities. Some older securities are infrequently traded, and suffer an illiquid market that may or may not reflect the current, market-determined interest rate for a security of that maturity.

Similar considerations apply to securities from other issuers including other governments, municipalities and utilities as well as commercial entities such as corporations. However, United States Treasuries, by virtue of their security and volume, occupy their own unique, and dominant, position as the most liquid securities in the market. Other bond issuers must pay higher yields to compensate for the market's lower confidence in the issuer's ability to pay, and lower liquidity. Furthermore, other bonds and notes are issued less frequently, in smaller volumes and in fewer denominations. In most cases, emphatically less frequently, smaller and fewer.

There is a need for effective electronic systems for facilitating trading in fixed income and other securities which systems can provide the market-making benefits of the outcry auction, yet which can accommodate high trading volumes with a low error rate and provide enhanced opportunities to brokers or other participant traders to make trades or deals. A number of electronic bond trading systems are known to the art.

In my U.S. Pat. No. 5,915,209, the disclosure of which is hereby incorporated herein by reference thereto, there is disclosed a computer-implemented bond trading system providing a private electronic auction enabling a trader to conduct a private auction to find and transact with a high bidder for, or low offerer of, a bond lot such as a municipal or other fixed income security lot. The auction can be conducted anonymously between remotely located brokers and dealers, across a wide area network, for example the Internet, so that only the trader conducting the auction sees the levels of interest expressed in the bids or offers for the bond lot. It would be desirable to have a trading system providing additional options to the trader.

Harrington et al. U.S. Pat. No. 6,161,099 teaches a method of conducting municipal bond auctions over the Internet wherein a bidder communicates with a bond issuer's computer to compute interest cost values specifying a borrowing cost, and to transmit bids to the issuer. Harrington et al. addresses the primary market wherein bonds are brought to market, and is of no help to traders seeking additional electronic trading options in the secondary market where bonds are traded after issue.

SUMMARY OF THE INVENTION

The present invention solves the problem of providing a bond trading program which provides a trader user of the program added trading functionality. According to the invention this problem is solved by providing a computer-implementable fixed income security trading program for effecting sales of one or more lots of a fixed income security, the program having an active trading screen comprising, on a single screen:

a) a listing of multiple bids for the fixed income security; and b) a listing of multiple offers for the fixed income security.

The novel screen display provided by the invention enables a trader to execute transactions in a novel manner, for example by hitting multiple bids, or taking multiple offers in a single transaction.

Preferred embodiments of the invention enable a trader to execute on multiple lots, show the public market a bid or offer which is less than their total order, spread a trade to another instrument and to obtain price improvement from a new bid or offer.

BRIEF DESCRIPTION OF THE SEVERAL VIEWS OF THE DRAWING

Some embodiments of the invention, and of making and using the invention, as well as the best mode contemplated of carrying out the invention, are described in detail below, by way of example, with reference to the accompanying drawings, in which like reference characters designate like elements throughout the several views, and in which:

FIG. 5 shows a spread window for spreading a transaction to another instrument, pursuant to another optional element of the bond trading program illustrated in FIG. 1;

FIG. 9 is a screen of a modified or alternative security trading program.

DETAILED DESCRIPTION OF THE INVENTION

Figure 1:
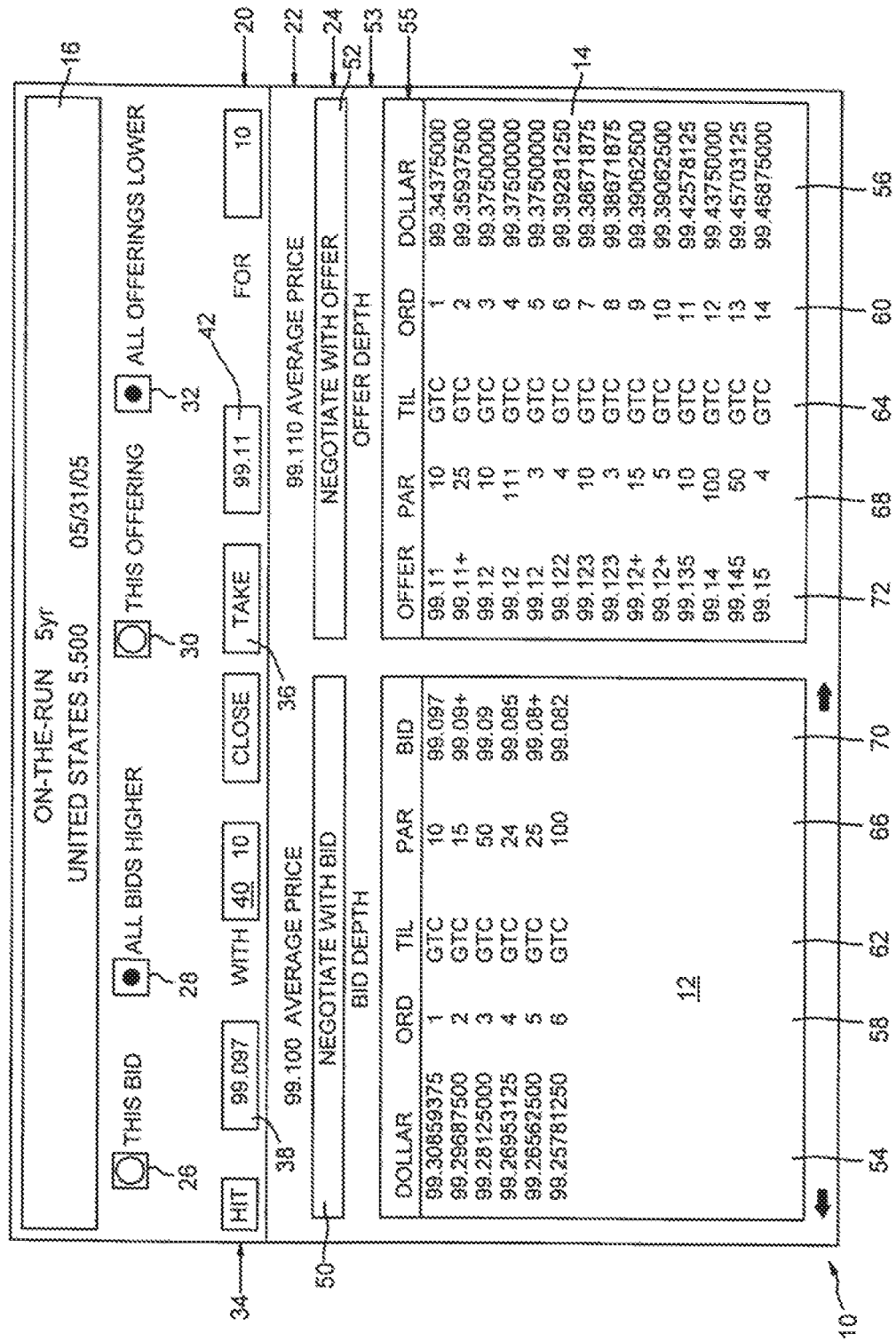
FIG. 1 shows a level-of-interest window on a given security, listing prices and lot sizes of a given security, much like a specialist's "book" in a conventional stock exchange, which level-of interest window is available in a bond trading program according to the invention, the program being implemented at a user's computer station.
Figure 2:
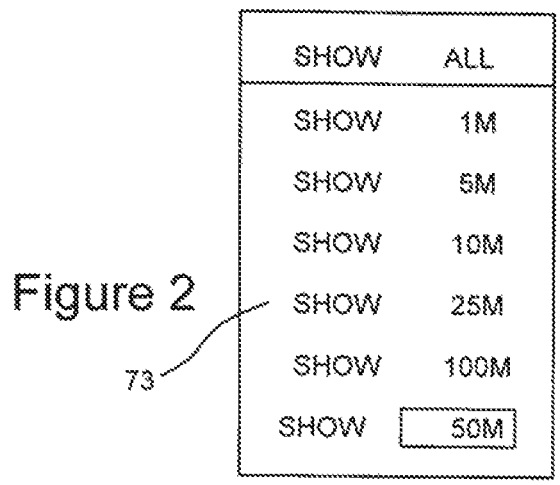
FIG. 2 shows a pop-up window for managing the levels-of-interest shown in the window of FIG. 1.
Figure 3:
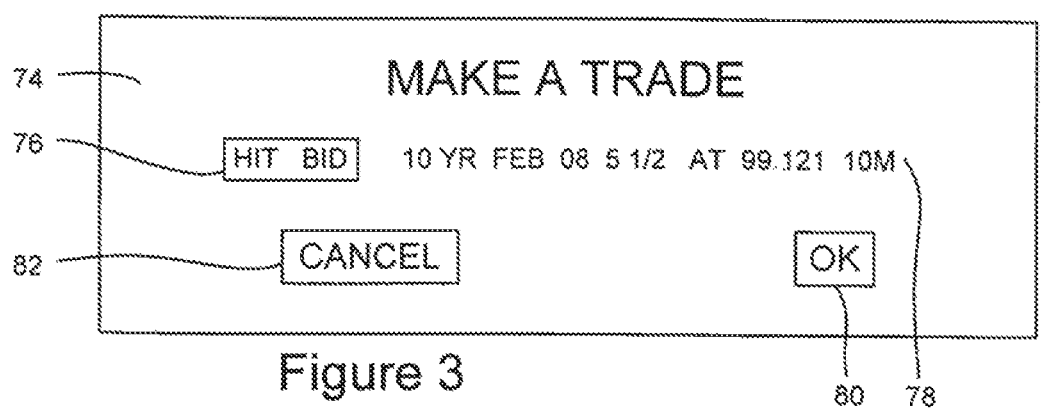
FIG. 3 shows a trade creation window, pursuant to an element of the bond trading program illustrated in FIG. 1.

Referring to FIGS. 1-3, a computer-implemented bond trading program according to the invention, intended for use by professional securities traders, who may be brokers acting on behalf of a client, or dealers acting on their own account, comprises, in addition to customary data entry, storage, reporting and management screens, similar for example to those described in my parent U.S. Pat. No. 5,915,209, a level-of-interest window 10.

Level-of-interest window 10 shown comprises, on its left-hand side a bid-listing pane 12 and, on its right hand side, an offer-listing pane 14. The top of level-of interest window 10 bears a title bar 16 displaying the descriptive particulars of a selected bond or bond category, the subject security, in this case a 5-year U.S. Treasury Note. As noted in title bar 16, the note matures on May 31, 2005 and has a coupon of 5.500 percent which is to say the rate of interest, based on par value. The note is designated "ON-THE RUN" meaning that the security is the current, or latest, issue for the maturity stated.

The system is applicable to trading in other fixed income securities including all types of United States treasury bills, notes or bonds, municipal bonds and corporate bonds. Some of its benefits may also be applicable to the trading of commodities, corporate stocks, mutual stocks, futures and derivatives of the foregoing, as will be apparent to those skilled in the art.

The user station is electronically linked, for example, via the Internet, to retrieve trading data whereby level-of-interest window 10 can be refreshed to display updated data in real time or with a slight delay.

"Real time" is used in a conventional sense herein and should be understood to suggest immediacy, subject to normal electronic processing delays and interruptions. Whether or not a user experiences a significant delay before receiving information or a response in what the invention contemplates as real time may depend upon the capabilities of the user's system the server system and any intervening network, or the efficiency of an external data source.

As will be explained in more detail below, panes 12 and 14 anonymously list information regarding the current market for the selected security which information comprises a number of active bids and offers, preferably all the active bids and offers known to the system regarding the selected security, a full listing. In a desirable embodiment of the invention, all trades, or all trades in a geographical area or other logical category are conducted employing the bond trading system of the invention and In a preferred embodiment of the inventive bond trading system, information regarding the bidding or offering trader or owner is not made available, until after a trade has been transacted and the bought and sold tickets are cut.

Beneath title bar 16 appear four rows 18, 20, 22 and 24 of screen controls. The various screen controls shown are divided into two groups: bid-related controls on the left, located above bid-listing pane 12; and offer-related controls on the right, located above offer-listing pane 14. Thus, beneath title bar 16, level-of-interest window 10 has a bidding side on the left and an offering side on the right, enabling the user to view bids and offers side-by-side, on a real time basis, in a convenient and beneficial manner not heretofore provided in a computerized system. Furthermore, in a preferred embodiment, the system enables a trader to execute a transaction with any displayed bid or offer, as will be explained in more detail hereinbelow.

The controls in row 18 determine the nature of the transaction the system will execute when actuated and comprise two pairs of "either/or" radio buttons, 26-28 and 30-32. When radio button 26, "This Bid", on the far left, is selected, e.g. by a mouse or other screen-pointing device, the system will execute a hit only for the bid selected. Alternatively, adjacent radio button 28 "All Bids Higher" may be selected, in which case, the system will execute a hit for the selected bid and for all higher bids displayed in bid-listing pane 12 at the moment of the hit.

Similarly, selecting radio button 30, "This Offering", on the right, sets the system to execute a take of an offering on the selected offering only and selecting alternative, adjacent radio button 32, "All Offerings Lower", sets the system to execute a take for the selected offering and all lower offerings displayed in offer-listing pane 14, at the moment of the take.

The particular value to the trader of this novel capability to simultaneously execute on multiple bids or offerings in a selected price bracket, will be apparent to those skilled in the art and will be more fully explained below.

Bids higher than a pre-existing and active offer, or offerings lower than a pre-existing bid are essentially improper and accordingly, none is shown. Such bids or offers, if attempted, are labelled "off-the-market" and are preferably denied posting by the system. Optionally, a user attempting to enter such an order is given the opportunity to execute "on-the-market", for example by adjusting the order price. The system can suggest an adjusted order price. If desired, a log of such off-the-market bids and offers may be system-maintained and made available to system administrators, or others on a restricted access basis.

The controls in row 20 provide, on the left a Hit button 34 which can be pressed to transact a hit on the selected bid and, on the right, a Take button 36 enabling the user to take a selected offer. Optionally, the system can provide for multiple bids or offers to be selected simultaneously, for example by dragging a pointer or using the customary control key, enabling multiple simultaneous hits or takes.

Box 38 to the right of hit button 34 prominently displays the amount, "99.097" of the bid being hit, and box 40 displays the lot size, "10". Box 42 to the right of Take button 36 prominently displays the amount, "99.11" of the offer being taken, and box 44 displays the lot size, "10". Boxes 38-44 clearly indicate to the user key data regarding the action to be effected by pressing Hit button 34 or Take button 36, for convenience, and to reduce the risk of error.

The controls in row 22 are passive, calculated data displays: display 46 indicates the Average Price of all the trading units bid, on a price per million basis; and display 48 indicates the Average Price of all the trading units offered, on a price per million basis. The number of trading units in each bid or offer is shown in the par columns, described below. Optionally, totals for the par values of all the outstanding bids and offers, and/or the difference between the totals, can be shown.

The controls in row 24 comprise two depressable bars: lefthand bar 50 "Negotiate With Bid" enables the user to submit a modified offer price or lot size; and righthand bar 52 "Negotiate With Offer" enables the user to submit a modified bid price or lot size. Preferably, such price negotiations are kept private, being displayed only to the counterparty, and possibly, the system operator.

Bars 50 and 52 can open new windows or programs wherein the user can submit an offer or bid different from any of the current bids or offers. For example, a trader-user seeking to buy 25 units (millions) of the subject note might negotiate with offer number 2 in offer-listing pane 14, by selecting the offer, pressing righthand bar 52 and entering a bid price, e.g. 99.093, along with the lot size. The price is calculated to appeal to the offerer having regard to the displayed "board" of bids and offers shown in Figure I, which is public and therefore also available to the offerer. In this example, the price of 99.093 is significantly higher than bid number 3, which might be divided to take advantage of offer number 2, but less than bid number 2 which has too small a lot size to take offer number 2.

It is probable that bid number 1 and offer number 1 will shortly go off the screen, possibly after minor negotiation to reduce the spread, a deal having been made and a sale transacted between the two listings. However, commission payment practices may influence the market dynamics.

The usual commission practice in the fixed income industry in the United States in 2001 is for the activator or "aggressor" to pay the commission. This practice may lead to a standoff, neither party wanting to become the aggressor and incur commission costs. Thus, instead of trading the parties may prefer to wait and see how the market develops and whether new levels appear on the bid side or the offer side. Thus, commission considerations provide one reason why the best offer may not transact with the best bid. There can be others.

The price difference, or spread, between bid #1 and lot #1 which is one thirty-second and one eighth, $3,515.00 on lot of 10 m, at the displayed prices must include the trader's commission, which is paid by the active deal maker, the trader who takes an offer or hits a bid. A typical commission on a U.S. Treasury deal is $30.065 per million par amount so that the commission on $10 million would be $300.65.

Alternatively, pursuant to the invention the practice of aggressor pays can be abandoned in favor of a split commission where the system charges both sides a commission, usually, but not necessarily, the same commission. In this event, the bid and offer prices will be the same. It is contemplated that the system may significantly lower transaction expenses through cost savings in professional personnel and support, enabling commission rates to be reduced and improving transaction efficiencies. Such productivity gains can be expected to improve market dynamics and increase transaction volume.

Panes 12 and 14, labeled "Bid Depth" and "Offer Depth", respectively, in a header row 53, comprise five columns each, referenced 54-72. Columns 54-72 display data regarding various characteristics of a number of bids or offers that are active in the system. The characteristics are labeled in a header row 55 which extends across the tops of columns 54-72. Columns 54 and 56 show the dollar price, in the case treasury note case illustrated, to eight decimal places and increments of one-two hundred and fifty-sixth (1/256) of a dollar. Columns 58 and 60 number the bids and offers, respectively in value order, descending for bids and ascending for offers. Columns 62 and 64 indicate for how long the bid or offer is good, in the example shown, "GTC", "good-'till-canceled" or revoked by the customer. The par value of the lot is shown in columns 66 and 68. In the treasury note case shown the par value is shown in trading units of millions of dollars, as is the practice for government bonds. Similarly, the par value can display in thousands for corporate and municipal bonds, as is their practice. The bid and offer amounts are shown in columns 70 and 72. The prices bid in columns 54 and 70 are shown in descending order while the offer prices asked in columns 56 and 72 are arranged in ascending order.

Columns 54-72 are arranged symmetrically in the middle of level-of-interest window 10, on either side of the border between panes 12 and 14, enabling the bid and offer prices in columns 70-72 to be viewed side-by-side with the highest bid and lowest offer adjacent one another. This carefully organized screen display has a number of advantages and is of particular value to a busy trader working in a hectic market. The best prices are clearly apparent at the tops of columns 70-72 and are easily compared with one another so that a user can see the spread between the bid and offer, or ask price. The next-best prices are also close to this point of attention where they are easily found and utilized. Other less close prices of less interesting bids and offers are ranked by their downward distance from the best prices, with bid prices descending and offer prices ascending.

Color coding or other graphic features can be employed, if desired, to emphasize these relationships and facilitate comprehension of the visual image. For example, the top line might be in larger type or highlighted or presented on a yellow or orange background, being colors which draw the eye. Descending colors could be yellow, then green then blue, suggesting distance from the top level, he level of greatest interest. All orders at the same price could be the same color, providing another area of visual acuity.

It will be appreciated that other screen placement configurations may be adopted which produce the result of emphasizing the best bid and offer levels, showing bids and offers side-by-side and making other bids and offers easily available for a trader-user to act upon. While the display of all levels known to the market on a single screen, or in a single window, is preferred, it will be understood that alternative embodiments are contemplated. For example, the best bid and offer levels might be shown on a screen, provided with an option button for displaying other levels. Also, it is contemplated that in an active market, there may be too many levels of interest to fit level-of-interest window 10, so that, at any given moment, not all levels of interest are displayed. In this case, the more interesting levels of interest can be automatically displayed and other, less interesting levels of interest can be made readily available by known means, for example by vertical scrolling, as is commonly used for file list displays.

This novel arrangement of bids and offers on a trader's screen, provided by the invention, facilitates comprehension of the market by the trader, and enables the trader to rapidly gain an overview of the market for a particular security, and to easily compare different, possibly competitive, securities by paging through level-of-interest windows for each using known paging means, for example by pressing "Next", "Previous", "Top" and "Bottom" buttons (not shown) or by opening a list window, or pop-up, or other comparable means. Such easily manipulated insights into market dynamics can give a sophisticated trader new opportunities to profitably exploit market niches, for example by browsing for attractive bids or offers on closely comparable securities. Alternatively, a trader may successfully predict that a surge in activity for one security will shortly spill over into another slightly different security whose activity appears to lag the market, bolstered by knowledge of the interest level in that security.

Par value amounts for the bids and offers, in columns 66-68, which indicate lot sizes, are carefully located closely adjacent the bid and offer prices in columns 70-72 where they are most useful to the trader. Thus, the center of the screen is the high interest zone for the trader and may be graphically enhanced to draw the user's attention, by screen lines, illustrations, icons, coloring or the like. If desired a zoom feature can be provided to expand a central zone containing information of greatest interest.

The dollar prices, columns 54 and 56 are the decimal prices, bid or asked, in dollars, per one hundred dollars of par value, i.e. a percentage. These columns serve as a reference tool and are useful for arithmetical purposes.

The bid and offer prices, in columns 70 and 72, are percentages of par value so that all prices shown represent a small discount on par, presumably because prevailing market interest rates are slightly higher than the illustrated note's coupon of 5.500 percent.

By tradition, the first two places of "decimals", i.e. the first two figures after the point, indicate the number of thirty-seconds (1/32) of a full point that are bid. A colon or dash may be used in place of the decimal point. Thus the first offer price, "99.11" is asking for a price of 99 11/32 percent of par for the lot offered.

The third place after the point subdivides the thirty-seconds into eighths so that the third place digit indicates the number of eighths of a thirty-second that is bid or offered, i.e. the number of two-hundred and fifty-sixths. By convention, a plus sign "+" is used instead of "4" to indicate an intermediate price of four/eighths or one-half of a thirty-second. Thus, the first bid price "99.097" is ninety-nine and nine thirty-seconds and seven eighths, i.e. one-eighth of a thirty-second short of ninety-nine and ten thirty seconds, "99.10". The second bid price "99.09+" is ninety-nine and nine-thirty-seconds and one half of a thirty-second.

Each horizontal entry in bid-listing pane 12 or offer-listing pane 14 comprises a level of interest in the market for the subject security, in this case a 5-year Treasury Note. The horizontal entries in bid-listing pane 12 are bids and those in offer-listing pane 14 are offers or offerings. Each bid or offer is a legal proposition by a qualified market participant which may be accepted by another qualified market participant. Preferably also, each bid and offer is active on screen so that a user may invoke a program routine employing the bid or offer by pointing, clicking, highlighting or otherwise selecting the bid or offer. For example, the user may double-click on the bid or offer to open a new window, e.g. a transaction window, or may right click and open a menu of options including, for example, "Hit" or "Take", as appropriate, "Negotiate", "Modify" and so on.

Usually, it will be a rule of participation that each participant must be able to fulfill a bid or offer made within the specified trading period, or with on-hand inventory or funds. Accordingly, it is preferred that participants are qualified to avoid fulfillment problems and to exclude deceptive or dishonest participation, for example, the making of bids or offers that a participant has no intention to fulfill, because such activities may disrupt the market and the trading process.

Accordingly, a bid shown in bid-listing pane 12 may be "hit" by the user's selecting the bid and pressing Hit button 34. The system then enables, and executes, transaction wherein the user sells the bond lot described in the bid to the bidder. Similarly, an offer shown in offer-listing pane 14 may be taken, or "lifted", to use a term often seen or heard in the art, by selecting the offer and pressing Take button 36. Preferably, when a bid or offer is hit or taken, the system promptly locks out other participants from hitting or taking the bid or offer and removes the respective bid or offer from the interest level displays of all users, or marks it sold.

Optionally, level-of-interest window 10 may also show, or provide button access to one or more recent transactions for the security. If desired, the security's transaction history can be made available in a separate window or pane.

Bids or offers can be imported, for example by APIs (application-program interfaces) or entered into the program by any desired method including import from other software programs or data sources via files received over common carriers, private lines or links, landlines, airwaves, satellite and so on. Preferably, however, bids and offers are posted into a trading program module of the inventive bond trading system, to ensure the bid and offer data is fully integrated into the system and can be made available to other users immediately, or shortly after posting. Suitable data entry screens and procedures are described with reference to FIGS. 1-8 of my U.S. Pat. No. 5,915,209.

In another embodiment of the invention, bids and offers are manually entered at the trader's station, or at a linked station in the trader's office, to the data entry system, employing data entry screens, from customer sources such as phone calls, emails and faxes. Manual data entry can be supplemented by electronically posting information regarding the security which is retrieved from source databases, or less desirably, from other available databases. Such information is preferably authenticated. A customer ID, or customer information, which is maintained in private, and identifies the seller or the buyer to be recorded for the security can be included by selection from a list or the like. Desirably, each new bid or offer is approved by an authorized professional before posting to the system and release for public distribution. For additional security and audit purposes, an electronic signature or other electronic imprint associated with the responsible trader can be stamped on each bid and offer record and centrally archived by the system, if desired. Such authorization stamp would not be publicly available. Known techniques such as public key infrastructure can be employed to facilitate security.

Although some enterprises may benefit from deploying the inventive bond trading program or system in-house, it is preferred that the system be deployed among a multiplicity of remotely located traders and that bids and offers be received into the system from any such, duly qualified traders wishing to participate and are system-presented to all other users to solicit hits or takes.

New bids and offers may be screened and organized in any desired manner. Preferably, new bids are electronically screened for authenticity, for example by identifying their source as being from an authorized program user. Public key-private key infrastructure ("PKI") can be used for this purpose. In one example of how such a security system might work, trader stations, or other authorized users, communicate all new bids, offers or other listings to an administrator station in an encoded form locked with a private key and accompanied by a public key. The private key is known only to the administrator and the particular trader, being communicated between them by means other than electronic file transmission, e.g. regular hand-delivery mail. The public key identifies the user enabling the administrator to select the appropriate private key to unlock the encoded new bid or offer.

Preferably also, new bids and offers are promptly integrated with existing bids and offers and the displays in bid-listing pane 12 and offer-listing pane 14 are automatically refreshed to display the new bids and offers without user intervention. Optionally, level-of-interest window 10 can include a Refresh button, not shown to refresh the screen to control the display of new bids and offers and remove traded and expired bids and offers. Choice of these functions may be user-settable, if desired.

If desired, a user alert, such as a flashing or highlighting of a new bid or offer for the subject bond, with a limited duration of perhaps five or ten seconds, can be provided to attract attention to newly arrived bids and offers. Alternative means such as a ticker tape crawling across the bottom or top of the screen can be provided to display to the user new bids and offers for all securities of interest to the trader, if desired. Optionally also, securities of interest may be specified in a setup routine for the ticker tape or other display. Other variables such as the size and price ranges of orders of interest that are newly bid or offered may also be set.

The traders or other users may be located locally, regionally, nationally or globally and their user stations may communicate via the Internet, other wide area network or by any other suitable means, as will be apparent to those skilled in the art. Such network or other means preferably also includes security means to ensure that data exchanged between users cannot be misused if intercepted. Alternatively, the inventive trading program or system can be deployed on a secure network which may, if desired, be a dedicated private-use or limited-access network, having reduced risk of intrusion or data misappropriation or corruption, for example a virtual private network overlaid on or supported by the Internet or the like. Such a network contrasts with the open-access general-purpose character of the Internet but might be deployed over the Internet.

The ability to view multiple levels of interest in a security, for example at least three and preferably five or more, or all available levels of interest, provides a number of advantages, to a prospective bond seller or purchaser and particularly to a user trader interested in rapidly transacting deals at favorable prices for their clients. The invention can also provide additional benefits by permitting the viewing of multiple levels of interest on multiple securities. Such multiple viewing can be enabled by tiling, listing, windowing or other techniques known in the computer arts.

Preferably, the bond trading program provides one or more users with an ability to view all the levels of interest expressed by system participants. Toward the end of a dynamic efficient market it is also preferred to enlist as participants, as many people as possible that wish to bid or offer on a particular security at a given time.

A particular advantage of the adjacent display on a single screen, or the bringing to a single window, of multiple levels of interest in a bond is the flexibility provided to a trader user including the ability to transact on multiple lots and the ability to hit any bid or take any offer displayed, even if it is not the best price.

Thus, a trader-user may wish to hit multiple smaller bids to subdivide a large offer or take multiple offers and combine them into a single lot to satisfy a client order which is larger than a single best price lot. For example, a trader with an order to sell 100 million of the subject security may satisfy this order by hitting bid #1 (10 m), bid #2 (15 m), bid #3 (50 m) and bid #5 (25 m), getting an average price slightly above 99.09, which is significantly better than the only bid for 100 m, bid #6 at 99.082. While the price would be substantially lower than other offerings, a quick sale results, which may be the best strategy in what appears to be a bear market, top-heavy on the offer side.

The speed with which it is expected that the invention will enable reasonable market orders to be satisfied is contemplated to give a trader new options and greater flexibility. Thus, a large parcel may quickly be unloaded in smaller units, with skilful price adjustments that avoid significantly impacting the market. Furthermore, because a trader can immediately see the impact on the market constituted by the group of actively participating traders, as new bids and offers are automatically posted to level-of-interest window 10, the trader can adjust both price and timing in the best interests of his client, for example by delaying release of additional lots of the parcel if the market clearly responds to initial lot postings with a distinct negative price movement. Alternatively, more lots can be quickly released if the market shows a clear appetite for the security at a price which is acceptable to the client.

An alternative strategy available to the trader, pursuant to the invention, is to select bid #6 and press button 50 to open a negotiation window (not shown) and negotiate with the bidder for a 100 m lot. The actual price offered in a negotiation will be influenced by prevailing commission rates, but, by way of illustrative example of the capabilities provided by the invention, the negotiating trader might offer 99.12, the same price as offer #4 for 111 m. The advantage to the sponsor of bid #6 is that they will not have to pay the commission: it will be paid by the offering trader in the negotiation, as the active party. The new offer can be presented to the sponsor of bid #6 in a number of ways, but is preferably directly, privately and anonymously system-presented to the relevant trader for example by completion of a negotiation window which can entail entry of the offer price and pressing a "Send to Bidding trader" button. Negotiation with an offer can be effected in a corollary manner.

A trader with an order to purchase 60 m, an awkward amount, not large enough to obtain price improvement, but too large to fill quickly, might take offers #s 1 and 2 only, regarding the price of 99.12 on offers #s 3-5 as too high, and enter a new bid for the relatively small and easily filled balance of 15 m.

These strategies, enabled by the inventive bond trading program, are not possible with systems which display only a single bid and offer price level at any given time.

A further and significant benefit of the simultaneous active display onscreen of both sides of the market, in depth, i.e. showing multiple levels of bids and offers at various prices is the ability to gain an overview of the state of the market for the bond in question. The total number of levels of interest, in this case 17, is indicative of the liquidity of the bond, a small number of bids and offers suggesting that the bond may be hard to move and a large number indicating that it will be easy to resell the bond or to augment a holding. Such considerations provide valuable additional information to the user which was not available prior to the invention and which may help a trader or other user make a more efficient decision to buy or sell the subject bond, or a competitive bond, having a more favorable level of interest. The balance between bids and offers is suggestive of the direction in which the price will move: if the lot value bid within a defined price bracket, say one or two thirty-seconds, of the market clearing price, significantly exceeds the lot value of offers within a similar bracket, it may be inferred that the market in the particular security displayed will rise and vice versa, that it will fall.

In the example shown, bid-listing pane 12 comprises a total of six bids having a total par value of $224,000,000.00 within a price bracket of 15/8 thirty-secondths (subtracting the price bid for lot #6 from the price bid for lot #1). The first ten lots in offer-listing pane 14 fall within the same price bracket of 15/8 thirty-secondths of the lowest offer and have a total value of $186,000,000.00, which is a significantly smaller number than the bid value total, suggesting that the price may rise unless a higher proportion of offers comes to the market. This is an example of a simple analytical deduction which may be made from the displayed levels of interest. The invention contemplates that other more sophisticated analyses may be made, as will be apparent to those skilled in the art.

Optionally, the program may display such helpful analytical results statistically, if desired, either in an additional display box or boxes in level-of-interest window 10, or in a pop-up window, or the like. For example, the program may permit the user to select a price bracket and show the total lot values bid and offered within that bracket; or to select a total par value bid or offered and selectively display the most favorable selection of countering lots that are available, preferably providing a price bracket indicator or an average price or both. Alternatively, or additionally, the system may provide lot value totals and average or bracket price information for the total level of interest available or displayed.

Thus, the ability to view multiple levels of interest provides a trader valuable, real-time information, that was previously unavailable regarding liquidity and market direction, enabling more and more profitable trading decisions and transactions.

A further benefit to the trader, pursuant to the present invention, can be obtained by providing an optional pop-up window, public level window 73, as shown in FIG. 2 to control the level of interest a trader shows when their bid or offer is displayed in level-of-interest window 10. Public level window 73 permits a user to show All 1 m, 5 m, 10 m, 25 m, 100 m or to enter any desired amount, e.g. 50 m, to show publicly. Showing more than an order is improper and attempts to do so will preferably be system-rejected, assuming the system has knowledge of the relevant order. Preferably, the show level is displayed only so long as the system is capable of executing on the larger, hidden amount, should that larger order level be accepted by another user. The system should be capable of doing this so long as an adequate order is present in the system. Public level window 73 can be activated from a bid or offer entry screen (not shown) and system-stored as a property of the bid or offer.

Using public level window 73, a trader can show less than their entire interest, thereby hiding the full extent of their interest. This feature may enable a trader to obtain a better price for a large lot or order than would be possible if the entire bid or offer were published. The presence of the large bid or offer can often adversely affect the market, causing levels to be withdrawn from the other side of the market and repriced unfavorably.

The bond trading software of the invention preferably also includes a procedure for transacting or executing a trade in response to a trader user pressing Hit button 34 or Take button 36, which trade transaction procedure can include a trade transaction window 74, such as is shown in FIG. 3. Preferably, when a trader accepts a bid or offer by activating button 34 or 36, the system removes the level from level-of-interest window 10, verifies that the accepted level still exists and is live, which is to say it has not been canceled, withdrawn or expired. If it is not still live, the trader is so notified and returned to level-of-interest window 10.

As shown in FIG. 3, trade transaction window 74 comprises a transaction type display 76 indicating the nature of the trade, "Hit Bid" and a bid description 78 which recapitulates the subject security and the bid details. If these are correct and the trader wishes to proceed and consummate the transaction they press OK button 80. The system then generates buy and sell tickets, forwards them to the appropriate parties and removes the bid from public display. Preferably transaction histories are system-maintained, with trader-related data, and made available to the respective trader.

Alternatively, the bond trading system can forward the transaction details to a trade capture program, utilized by the trader or to the trader's back office systems, for completion of the administrative part of the transaction. API's or other known means can provide a transparent interface between systems, if necessary.

Completion of the trade is preferably effected with fully automated systems providing straight-through processing from the front office, where the trader operates, to the back office where the transaction is reconciled with the buyer's and seller's accounts, file histories and archives are prepared and trade confirmations, or buy and sell tickets, are prepared and forwarded for settlement, possibly via electronic communication with the counterparty trader.

If the details are incorrect, or the trader no longer wishes to complete the transaction, they can press Cancel button 82.

Transaction of a taken offer can be effected in a corollary manner to hitting a bid, in which case transaction type display 76 will display "Take Offer".

When the trader hits a bid, the system can prompt the hitting trader to provide information as to the security lot, or lots, in the trader's inventory, or the trader's customer's inventory that should be used to fulfill the order. Alternatively, the system may automatically check the appropriate inventory and suggest one or more lots that should be used to fulfill the order, final determination or confirmation being made by the trader. Similarly, the system can prompt for information as to the identity of the purchaser and any other necessary information in response to a take of an offer. Alternatively, and additionally, if desired, the system can search through pending customer orders for a match or close match and prompt for confirmation or changes.

If the system finds a pending offering for the security larger than the lot hit, the system can prompt for additional bids to hit. Similarly, if the system finds an order for a larger lot of the offered security the system can prompt for additional offers to take.

In a valuable optional feature of the invention, prior to executing the trade, the system responds to activation of OK button 80 by invoking a price improvement procedure which searches for any new bids or offers that may have recently entered the system and have not yet been displayed to the accepting trader. The system checks the new bids or offers for a better price which, if found with all other particulars identical to the hit bid or taken offer, is system-accepted and displayed to the trader. The system functions on the premise that a higher selling or lower buying price will automatically be acceptable. A trader willing to sell at 99.10 will certainly be willing to sell at 99.11.

Figure 4:
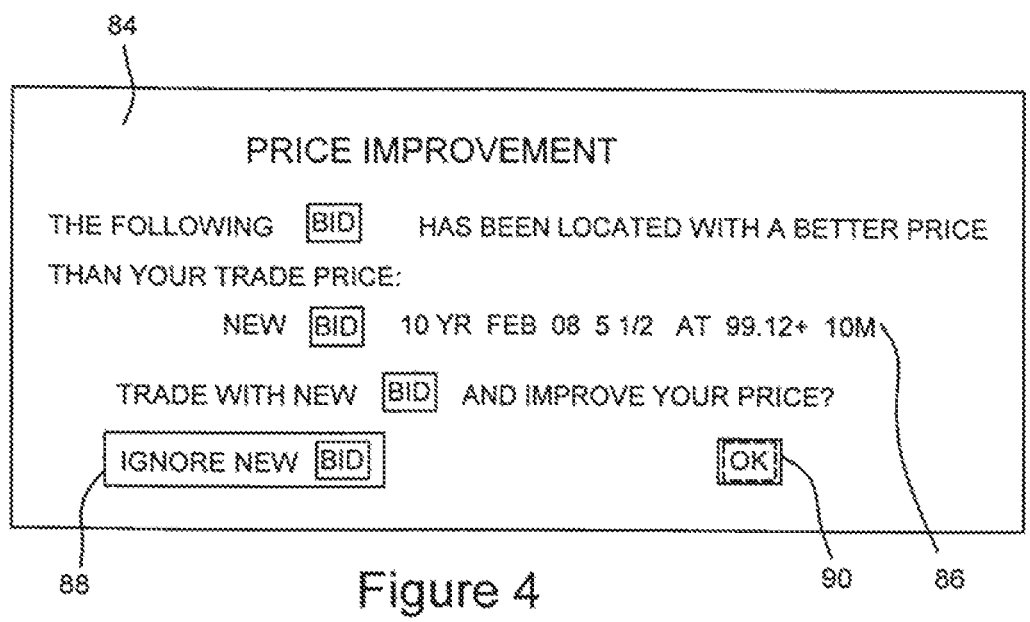
FIG. 4 shows a price improvement window, pursuant to an optional element of the bond trading program illustrated in FIG. 1.

However, as a user-settable option, if desired, a confirmation procedure can be provided, for example in a window such as Price Improvement window 84 shown in FIG. 4. Price Improvement window 84 comprises a bid description 86 which provides details of the type and nature of the new bid or offer. These may differ slightly from the hit bid or taken offer, for example with regard to lot size, or possibly, as a result of system error. The trader can accept the new bid, in which case the system returns to trade transaction window 74, FIG. 3 substituting the new bid for the prior bid and redisplaying the prior bid for action in level-of-interest window 10. The trader again presses OK button 80 to complete the transaction. Again, the system checks for a better price, and if none is found, which is probable in view of the short time interval since the last check, completes the transaction as described above. If a still better price is found, Price Improvement window 84 is again displayed and the procedure is repeated.

The novel price improvement procedure of the invention enables a trader to obtain a better price in a way which was not heretofore possible. Such price improvement may be of great value in a fast moving market. Up-to-the second price improvement where a transaction can be improved after acceptance of a level and prior to completion is believed to be new to the bond trading marketplace and is beneficial in creating a more even trading environment without use of an exchange.

If, for any reason, the trader does not wish to complete the transaction with the new bid, for example, because the lot size or other parameter does not meet the trader's requirements they can press Ignore New Bid button 88 and complete the transaction with the prior bid. Price improvement of an accepted offer can be effected in a corollary manner to that for a bid, in which case the term "bid" is replaced with the term "offer" throughout Price Improvement window 84.

Figure 5:
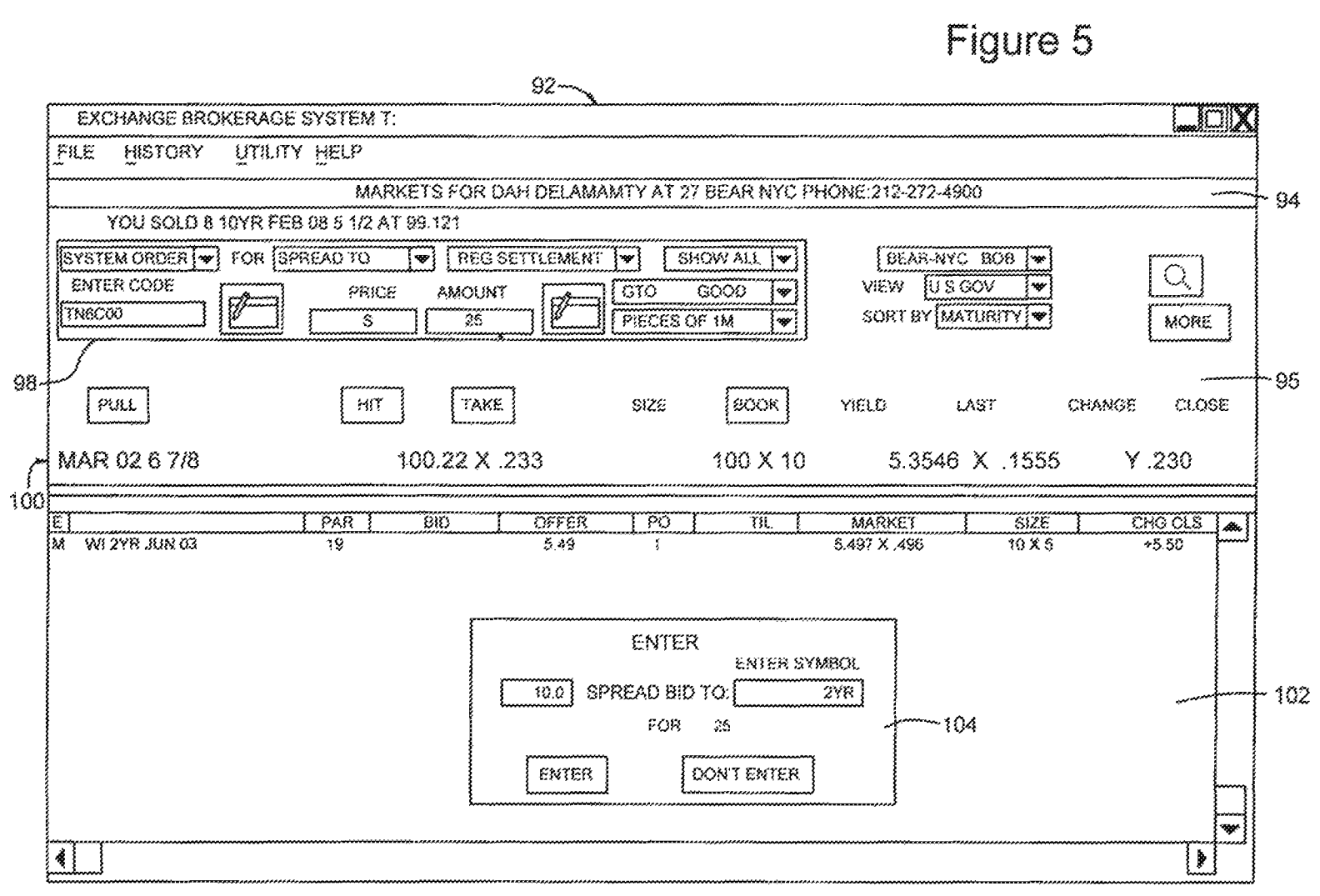

Another valuable optional feature of the inventive bond trading program is illustrated by spread window 92 shown in FIG. 5 which provides a dynamic pricing option for bids and offers whereby the system can automatically adjust the price of a bid or offer in response to a trader-specified market parameter available to the system whereby the price bid or offered is changed without further trader intervention after setup.

In one example of such a spread, the price of a bid or offer order for a low activity bond, such as one with only a few months to maturity, can be linked to the price of a more frequently traded instrument such as a 2 yr note. Preferably, the trader has the option to insert a spread margin indicating the relationship of the subject security's price to the reference price, for example a yield difference, expressed in basis points, each of which is one-hundredth of a percentage point (0.01%).

A header bar 94 in an upper pane 95 of spread window 92 identifies the trader using the program. Immediately beneath header bar 94, line 96, the trader's last sale is described. Box 98 on the left below line 96 has a number of descriptors and drop-down menus providing the trader a range of options, where the various alternatives and optional features of the invention that have been described herein may be accessed. For example, "System Order" under which the spread function is grouped, might be switched to "Client Order" or another category bringing up a different data entry screen; "Spread to" can be changed to "Swap for" (see FIG. 6) and other system functions; settlement may be switched to other than "regular"; and other categories may be changed as is apparent from the right-hand column of box 98. The price label in this case is "S" for swap.

Line 100 beneath box 98 gives the particulars of the security for which a bid or offer is to be placed. In this case it has a maturity of March 2002, three months from a hypothetical trading date of Jan. 1, 2002, a coupon of 6⅞ percent, a par bid price of 100.22 (one hundred dollars and twenty-two thirty-secondths of a dollar per one hundred dollars par value) and a par offer price of 100.233, a lot size of 100 million, a bid price yield of 5.3546% and an offer price yield 0.1555% lower. The bond was down on the last trade with par 23 bid.

Lower pane 102 lists possible target securities for price linking, one of which can be selected and displayed in spread entry box 104 where the details may be adjusted and the trader can decide to enter or not enter the spread. As shown, the price of the March 2002 bond is going to be spread to the 2 yr instrument maturing in June 2003, for the full amount of 25 pieces of 1 m, i.e. $25,000,000.00 par value, with a spread of 10, i.e. ten basis points, one tenth of a percent. Once entered, a new bid for 25 million of the March 2002 bond is posted and made available to all system users. As sales of the liquid June 2003 bond are made, the publicly displayed bid price of the March 2002 bond is changed to reflect the change in the June 2003 bond price. The spread to function enables a trader to keep a bid (or offer) for an inactive security in line with the market price of a liquid, frequently traded security.

Figure 6:
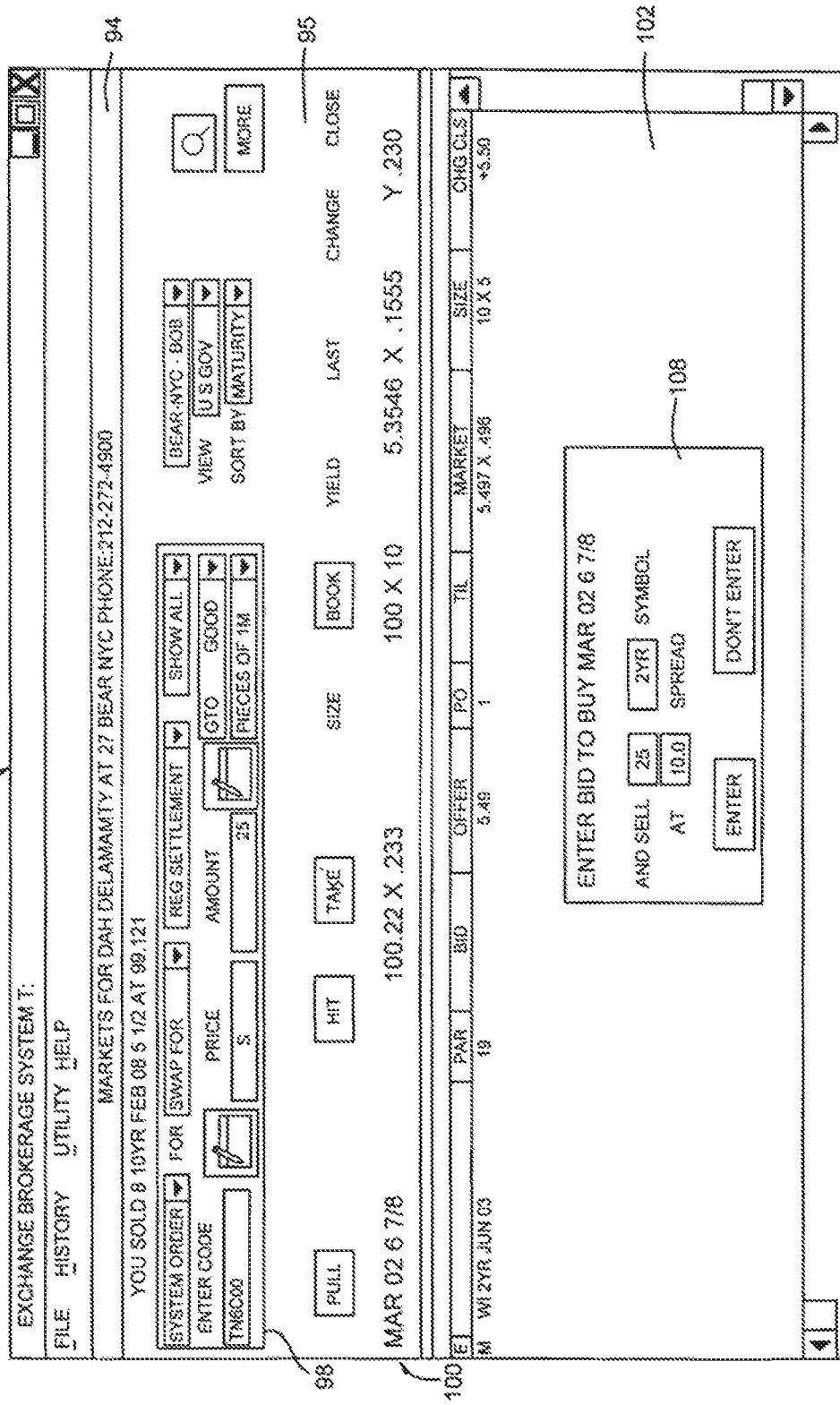
FIG. 6 shows a swap, or switch window for simultaneously executing a buy and a sell of different instruments, being another optional element of the bond trading program illustrated in FIG. 1.

A still further valuable optional feature of the inventive bond trading program is illustrated by swap window 106 illustrated in FIG. 6. A swap enables the trader to take advantage of a compatible bid and offer by simultaneously buying one security and sell another at a suitable spread. Swap window 106 is similar to spread window 92 with the "Swap for" function selected in box 98 to display a swap entry box 108. In the case shown, the trader is buying 25 Mar 02 6⅞ and selling 25 2 yr "on-the-run" notes at 10 spread. The system executes both transactions.

Figure 7:
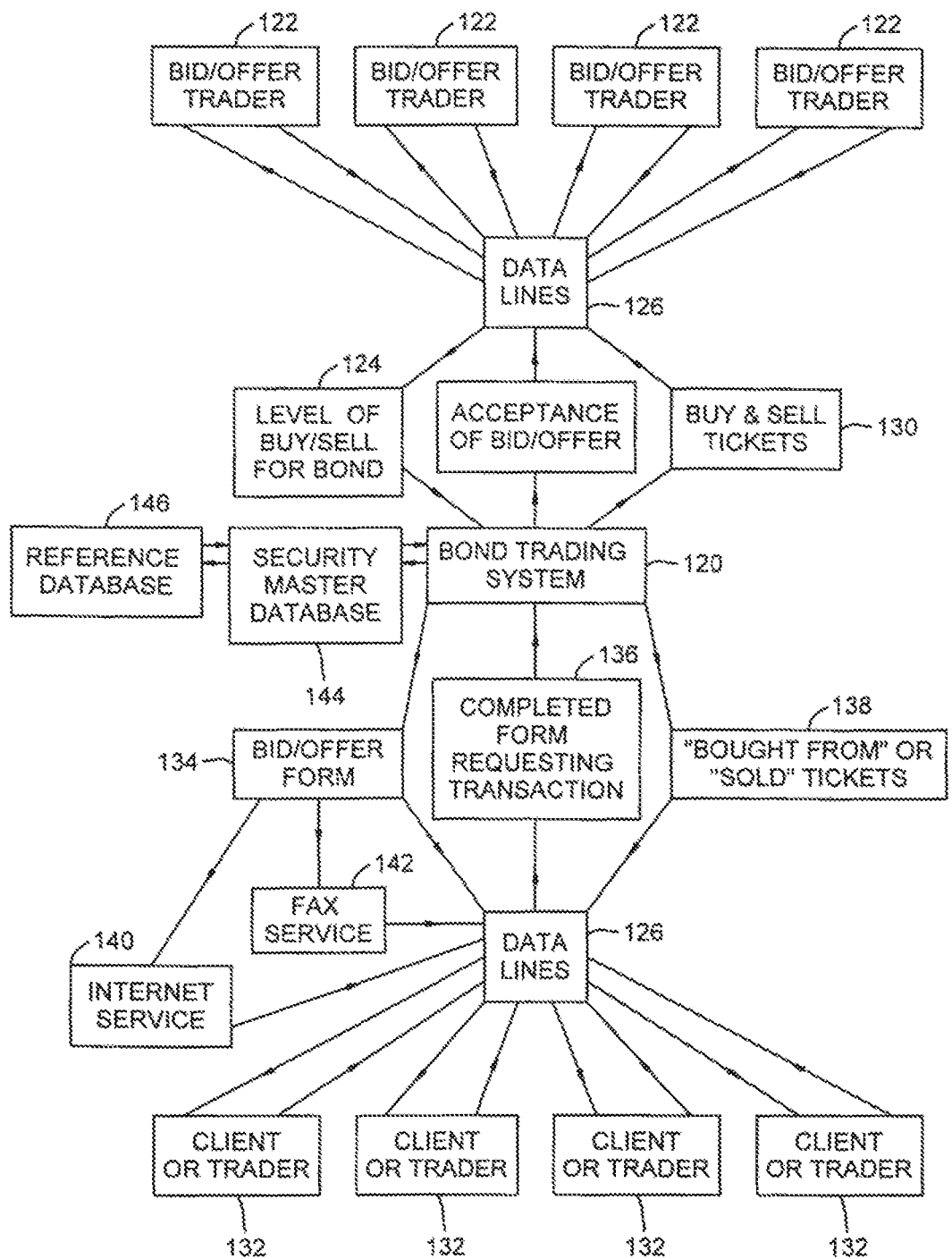
FIG. 7 is a schematic block diagram showing one possible implementation of the bond trading program illustrated in Figure I, in a system comprising multiple remotely connected users.

FIG. 7 provides a schematic illustration of one possible implementation and use of the bond trading program and system of the invention. Bond trading system 120 comprises a bond trading program according to the invention as described herein implemented on a suitable computer in a subject bond trader's office. The computer may, for example, be a state-of-the-art personal computer, such as, in early 2001, a DELL OPTIPLEX (trademark, Dell Computer Corporation) GX200 system with an 866 MHz PENTIUM III (trademark, Intel Corp.) processor, 256 MB RDRAM and a 20 GB hard drive. Some features of the implementation shown are similar to the disclosure of my U.S. Pat. No. 5,915,209 from which further detail may be obtained.

Bidding-and-offering-traders 122 communicate bids and offers at various levels, box 124 via data lines 126, for viewing by the subject trader. Acceptances 128 and buy-and-sell tickets 130 can be returned to bidding-and-offering traders 122 also over data lines 126.

The subject trader 120 can also communicate with clients 132, who may also be traders, over data lines 126 for the receipt of orders to buy or sell security lots, for transmission of bid/offer forms 134, of completed forms 136 requesting transactions on bids or offers received on the client's behalf by the subject trader, and "bought from" and "sold to" tickets 138. If desired, bid/offer forms 134 can be transmitted via an Internet service 140 or fax 142.

Formal particulars of securities traded, including CUSIP (trademark) numbers can be obtained by bond trading system 120 from a local security master database 144 or a remote reference database 146, as described in my U.S. Pat. No. 5,915,209.

Data lines 126 may indicate any suitable electronic communication system including a preferred virtual or real private network carried by public carriers, preferably with global reach, the Internet, a wide area network, local area network or other suitable system.

Optionally, each of bidding-and-offering traders 122 and clients 132 may implement bond trading system 120, with the modules or implementations communicating one with another across data lines 126.

It will be understood that an individual trader may play the role of a bidding or offering trader 122 for one transaction while becoming a client trader for another transaction.

FIG. 7 illustrates how a public auction of a fixed income security lot, for example a United States treasury bill, note or bond may be conducted between many parties with all bids and offers being anonymously posted on the system to be viewed by all parties. All participants may see all levels of interest.

Figure 8:
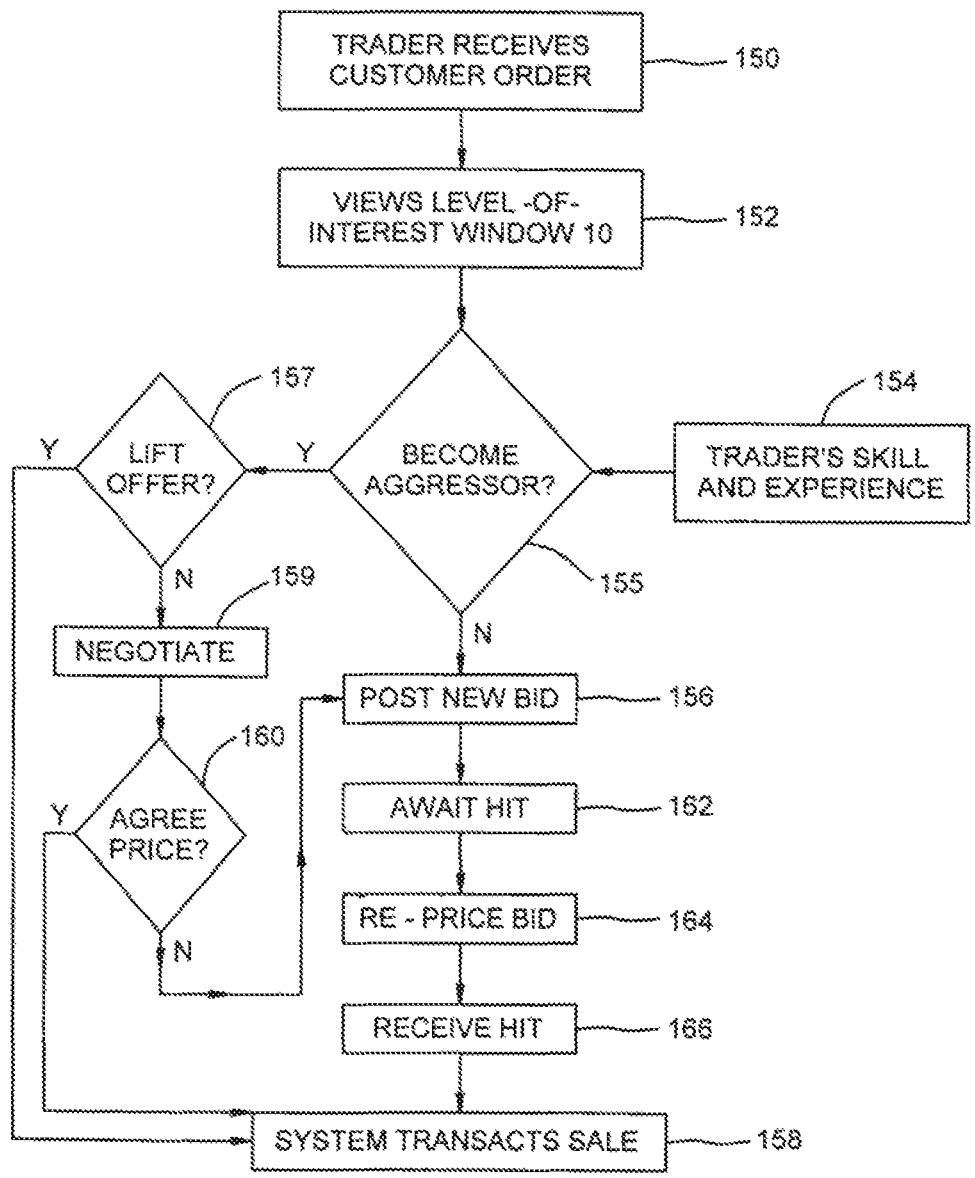
FIG. 8 is a schematic block flow diagram of the bond trading program illustrated in FIGS. 1-7.

Referring now to FIG. 8, in one example of the use of bond trading system 120, the subject trader receives a customer order, step 150, to purchase a specified quantity of a particular bond. The trader selects a level-of-interest window 10 for the particular bond and views the full depth of market interest in the bond in the system, as shown by the pending bids and offers in level-of-interest window 10, step 152. Utilizing their skill and experience 154, the trader evaluates the displayed bids and offers, making judgments as to how best to fulfill their client's interest, and decides whether or not become the aggressor, step 155 and take or negotiate with an offer. If the decision is not to become the aggressor, step 155N, because the trader judges none of the pending offers to be acceptable or negotiable, the trade enters the market on the passive side and posts a new bid, step 156.

Also factored into the trader's decision to become an aggressor or not, step 155, is the prevailing commission protocol, which may require the aggressor to pay the commission and will therefore influence the trader's judgment of the price levels of current offers.

If the subject trader decides to become the aggressor, step 155Y, the trader then has the options of lifting or negotiating with one or more of the pending offers. In step 157, the trader decides whether or not to take the offer. If the offer is taken, step 157Y, the system transacts the sale, step 158. If the trader decides not to take an existing offer as is, step 157N, but has identified one or more of the pending offers as being of sufficient interest to be negotiable, they highlight the offer and activate negotiate-with-offer bar 52, to negotiate with the offering trader, step 159. If the two traders agree a price, step 160Y the system is so instructed and transacts the sale, step 158. If a price cannot be agreed and no other offer is judged adequate for negotiation, the subject trader proceeds to post a new bid, step 156.

After posting a new bid, the trader passively awaits a hit, step 162, enabling the trader to get on with other business. Optionally, if a hit is not received within a trader-determined time interval, the bid is withdrawn, repriced and re-posted to the system, step 164. If necessary steps 162 and 164 can be repeated. When a hit is received, step 166, the system transacts a sale, step 158.

The duration of step 162 may be trader-determined, operating "manually", i.e. the trader simply intervenes and performs step 164 on his own schedule, or, more preferably is system-effected. To this end, the system can permit the trader to select a time interval, e.g. 15 minutes, 30 minutes, 1 hour, two hours, etc after which the system withdraws and re-presents the bid to the trader for repricing. The system can suggest a new price. Alternatively, re-pricing may be automated up to (or down to, in the case of offers) a predetermined limit, on a trader-determined schedule, whereby the price is system adjusted, without consulting the trader at regular intervals until the limit is reached or the transaction is effected.

Orders to sell can be effected by processing offers in a corollary manner.

Figure 9:
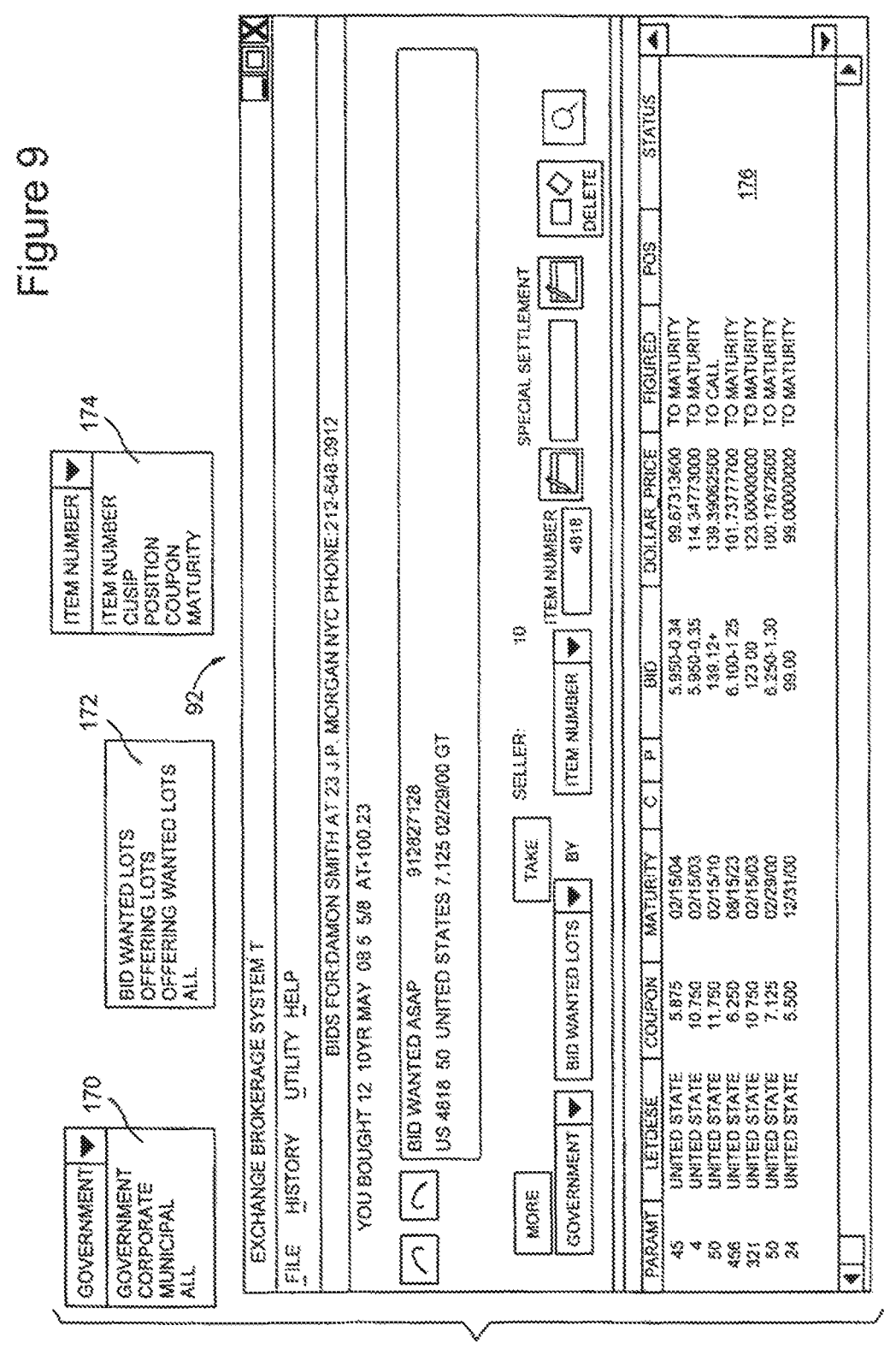

Referring now to the program screen shown in FIG. 9 another embodiment of bond trading program according to the invention provides the trader the ability to choose among different trade procedures including the methods of the invention described herein and the novel auction processes described in my U.S. Pat. No. 5,915,209. The screen shown is a multi-purpose bid/offer entry form which comprises multiple drop-down menus 170-174 enabling the trader to choose different system procedures including the bonds to display, menu 170, the type of lots to display menu 172 and a menu of sort keys, menu 174 for listing live orders the trader has in the system so that the user may manage and monitor their exposure in the market place. The system enables the trader to check the level of bid.

As may be seen, the trader can not only prepare, and using other system functionality distribute, bid and offering wanted lots for conducting private auctions, but can also prepare offerings lots and bids (not shown) for public posting for transaction or negotiation, as described herein. After the auction or other transaction is concluded, the status field displays whether or not the lot traded" was priced to market was priced to the high bidder or was withdrawn.

The invention makes possible a variety of novel optional features to assist a securities trader which derive from or can be associated with the convenient display to the trader, in transactable form, of multiple levels of interest in a security. For example, level-of-interest window 10 can include dynamic price and volume indices conveniently displaying price movement in unit time and/or volume transacted in unit time for the security shown. A price volatility index could also be displayed indicating price change per unit volume transacted. Such indices would preferably be calculated upon and immediately updated from system-completed transactions. Corresponding statistical indices could also be system-calculated and displayed to track the prices and volumes of bids and offers posted to the system. Equivalent dynamic indices could be provided for a group of securities regarded as fungible i.e. having some degree of interchangeability: if one is not available at an acceptable price, then the other will probably be acceptable to the client.

The present invention is particularly suitable for application in the financial industry providing marketable or licensable systems for trading fixed interest securities including bonds. It will be understood that the systems and software referenced herein include, either explicitly or implicitly, software implemented on computers or other appropriate hardware, including such other intelligent data processing devices having a processor, data storage means and the ability to support an operating system, with or without user interfaces, for example, file servers, as may be useful in achieving the objectives of this invention.

Suitable developer tools for creating the software programs disclosed herein are well known to those skilled in the art and include for example MICROSOFT VISUAL FOXPRO 6.0 (trademarks) database development system.

Software components and applications embodying the invention can be distributed in electronic bit storage on magnetic, optical, bubble or other media, and optionally in transportable form to be interactive with an electronic reading device, for example, on computer or optical diskettes, or may be distributed by downloading over wired or wireless networks, including the Internet, derivatives, modifications and offspring of the Internet, for storage by the recipient on such media.

It will further be appreciated that such media-stored software constitutes an electronic customizing device which can interact with a magnetically or optically cooperative computer-based input device enabling the computer to be customized as a special purpose computer, according to the contents of the software.

While illustrative embodiments of the invention have been described above, it is, of course, understood that various modifications will be apparent to those of ordinary skill in the art. Many such modifications are contemplated as being within the spirit and scope of the invention.

The invention claimed is:

1. An apparatus comprising:
    at least one memory storing programming instructions;
    at least one computing device of an electronic trading system programmed to receive a plurality of bids and offers for a financial instrument, the plurality of bids and offers being submitted electronically over an electronic computer network by a plurality of computers in electronic communication with the electronic trading system, the at least one computing device being in electronic communication with the at least one memory;
    the at least one computing device being programmed to display at a display device of a user computer an interface for trading of the financial instrument by a user, wherein:
        the interface is configured to display bid information comprising bid listings for trading a plurality of bids for the financial instrument, the bid information comprising a first bid indicia corresponding to a best bid price and at least one other bid indicia corresponding to other bids having off-best bid prices lower than the best bid price; and
        the interface is configured to display offer information comprising offer listings for trading a plurality of offers for the financial instrument, the offer information comprising a first offer indicia corresponding to a best offer price and at least one other offer indicia corresponding to other offers having off-best offer prices higher than the best offer price;

the interface is configured to display the bid and offer listings in side-by-side vertical lists at the display device respectively ordered by bid value and offer value, with the best bid positioned associated with the best offer, the at least one computing device programmed to omit display of at least some predetermined price levels between displayed levels, the at least one computing device is programmed to receive from the user computer at least one electronic message comprising a selection via the interface of at least one off-best bid or off-best offer and instructions to execute the selected off-best bid or off-best offer;

the at least one computing device is programmed to execute the selected off-best bid or off-best offer at, respectively, a price worse than the best bid or best offer; and the at least one computing device is programmed to determine that the user selected two or more of the off-best displayed bids or two or more of the off-best displayed offers, and to cause the selected two or more off-best displayed bids or two or more off-best displayed offers to be executed simultaneously.

2. The apparatus of claim 1 wherein:
the at least one computing device is programmed to display to the user computer a proportion-of-par value of each bid or offer adjacent the bid or offer price.

3. The apparatus of claim 1, wherein:
the selected two or more off-best displayed bids or selected two or more of the off-best displayed offers are at different price levels.

4. The apparatus of claim 3, wherein:
the at least one computing device is programmed to receive a user selection of multiple of the displayed bids or offers simultaneously, the multiple of the displayed bids and offers being selected simultaneously via the interface.

5. The apparatus of claim 3,
wherein the selected two or more off-best displayed bids or two or more of the off-best displayed offers comprise two selected off-best displayed offers.

6. The apparatus of claim 3, in which the at least one computing device is further programmed to:
receive a selection of at least two displayed offers at different prices; and
cause the at least two selected displayed offers to be executed sequentially in a sequence based on the prices of the offers.

7. The apparatus of claim 6, in which the at least one computing device is further programmed to:
cause the at least two selected displayed offers to be executed sequentially in an ascending-price sequence.

8. The apparatus of claim 3, the at least one computing device is further programmed to:
receive a selection from the user of a third offer of the displayed plurality of offers;
determine that a fourth offer has been received after receiving the selection from the user of the third offer, the fourth offer having a price better than the price of the third offer; and
cause a dialog window to be displayed at the user computer station, the dialog window comprising information regarding the fourth offer and at least one element for the user to selectably accept or ignore the fourth offer.

9. The apparatus of claim 1, in which the at least one computing device is further programmed to:
cause to be executed orders pending at prices at or better than the selected off-best bid or off-best offer in combination with the selected bid or offer.

10. The apparatus of claim 9, in which the program is further designed to cause the apparatus to:
execute the best bid or best offer as part of the combination.

11. A method comprising:
receiving, by at least one processor of at least one computer in electronic communication with a plurality of other computers via an electronic communications network, a plurality of bids and offers for a financial instrument, the plurality of bids and offers being submitted electronically over the electronic computer network by a plurality of computers in electronic communication with the at least one computer;
cause to be displayed, by the at least one processor, at a display device of a user computer an interface for trading of the financial instrument by a user, in which the act of causing the interface to be displayed at the display device comprises:
displaying bid information comprising bid listings for trading a plurality of bids for the financial instrument, the bid information comprising a first bid indicia corresponding to a best bid price and at least one other bid indicia corresponding to other bids having off-best bid prices lower than the best bid price; and
displaying offer information comprising offer listings for trading a plurality of offers for the financial instrument, the offer information comprising a first offer indicia corresponding to a best offer price and at least one other offer indicia corresponding to other offers having off-best offer prices higher than the best offer price,
wherein the bid and offer listings are displayed in side-by-side vertical lists respectively ordered by bid value and offer value, with the best bid positioned associated with the best offer, the at least one processor being directed to omit display of at least some predetermined price levels between displayed price levels,
receive, by the at least one processor, from the user computer at least one electronic message comprising a selection via the interface of at least one off-best bid or off-best offer and instructions to execute the selected off-best bid or off-best offer; and
cause to be executed, by the at least one processor, the selected off-best bid or off-best offer at, respectively, a price worse than the best bid or best offer,
in which the selected off-best bid or off-best offer comprises two or more of the off-best displayed bids or two or more of the off-best displayed offers, and
in which the selected two or more off-best displayed bids or two or more off-best displayed offers are executed simultaneously.

12. The method of claim 11,
in which the financial instrument is a fixed income security, and
in which the act of causing the interface to be displayed at the display device comprises causing to be displayed at the display device a proportion-of-par value of each bid or offer adjacent the bid or offer price.

13. The method of claim 11, wherein:
the financial instrument to be traded is a United States treasury bill, note or bond, a municipal bond or a corporate bond, and
in which the selected two or more off-best displayed bids or selected two or more of the off-best displayed offers are at different price levels.

14. The method of claim 11, in which the act of receiving at least one electronic message comprising a selection of at least one off-best bid or off-best offer and instructions to execute the selected off-best bid or off-best offer comprises:
receiving a simultaneous selection of multiple of the displayed bids or offers, the multiple of the displayed bids or offers being selected by the user simultaneously via the interface.

15. The method of claim 11, further comprising:
receiving an instruction comprising a selection of at least two displayed bids at different prices; and
causing to be executed the at least two displayed bids sequentially in a descending price sequence.

16. The method of claim 11, further comprising:
receiving, by the at least one processor, a selection from the user of a third offer of the displayed plurality of offers;
determine that a fourth offer has been received after receiving the selection from the user of the third offer, the fourth offer having a price better than the price of the third offer, the price of the fourth offer being lower than the price of the third offer; and
cause a dialog window to be displayed at the interface, the dialog window comprising information regarding the fourth offer and at least one element for the user to selectably accept or ignore the fourth offer.

17. The method of claim 11, further comprising:
causing to be executed orders pending at prices at or better than the selected off-best bid or off-best offer in combination with the selected bid or offer, in which the best bid or best offer is executed as part of the combination.

18. A non-transitory machine-readable medium configured to store instructions which, when executed by at least one processor of at least one computer in electronic communication with a plurality of other computers via an electronic communications network of an electronic trading system, direct the at least one processor to:
receive a plurality of bids and offers for a financial instrument, the plurality of bids and offers being submitted electronically over the electronic computer network by a plurality of computers in electronic communication with the at least one computer;
display, at a display device of a user computer an interface for trading of the financial instrument by a user, in which the act of displaying the interface comprises:
displaying bid information comprising bid listings for trading a plurality of bids for the financial instrument, the bid information comprising a first bid indicia corresponding to a best bid price and at least one other bid indicia corresponding to other bids having off-best bid prices lower than the best bid price; and
displaying offer information comprising offer listings for trading a plurality of offers for the financial instrument, the offer information comprising a first offer indicia corresponding to a best offer price and at least one other offer indicia corresponding to other offers having off-best offer prices higher than the best offer price,
wherein the bid and offer listings are displayed in side-by-side vertical lists respectively ordered by bid value and offer value, with the best bid positioned associated with the best offer, the at least one processor being directed to omit display of at least some predetermined price levels between displayed price levels,
receive from the user computer at least one electronic message comprising a selection via the interface of at least one off-best bid or off-best offer and instructions to execute the selected off-best bid or off-best offer; and
cause to be executed the selected off-best bid or off-best offer at, respectively, a price worse than the best bid or best offer,
in which the selected off-best bid or off-best offer comprises two or more of the off-best displayed bids or two or more of the off-best displayed offers, and
in which the selected two or more off-best displayed bids or two or more off-best displayed offers are executed simultaneously.

* * * * *